United States Patent
Braxton

(10) Patent No.: US 9,918,283 B2
(45) Date of Patent: Mar. 13, 2018

(54) SYSTEMS AND METHODS FOR CONTROLLING AND LOCATING THE SOURCE OF A REMOTE BEACON SIGNAL

(71) Applicant: GroupCare Technologies, LLC, Boca Raton, FL (US)

(72) Inventor: Mark D. Braxton, Barton, NY (US)

(73) Assignee: GroupCare Technologies, LLC, Boca Raton, FL (US)

(*) Notice: Subject to any disclaimer, the term of this patent is extended or adjusted under 35 U.S.C. 154(b) by 0 days.

(21) Appl. No.: 15/204,410

(22) Filed: Jul. 7, 2016

(65) Prior Publication Data
US 2017/0013569 A1 Jan. 12, 2017

Related U.S. Application Data

(60) Provisional application No. 62/189,382, filed on Jul. 7, 2015.

(51) Int. Cl.
*H04W 52/24* (2009.01)
*H04B 17/00* (2015.01)
(Continued)

(52) U.S. Cl.
CPC ............ *H04W 52/245* (2013.01); *G08B 3/10* (2013.01); *G08B 21/0263* (2013.01);
(Continued)

(58) Field of Classification Search
CPC ........... H04M 1/7253; H04M 2250/02; H04W 84/18; H04W 76/02; H04W 88/06; H04W 52/228; H04W 52/04; H04W 52/06; H04W 52/08; H04W 52/10; H04W 52/12; H04W 52/125; H04W 52/14; H04W 52/143;
(Continued)

(56) References Cited

U.S. PATENT DOCUMENTS

| | | | |
|---|---|---|---|
| 2009/0170554 A1* | 7/2009 | Want | H04M 1/72502 455/552.1 |
| 2009/0233623 A1* | 9/2009 | Johnson | H04W 4/02 455/456.3 |

(Continued)

OTHER PUBLICATIONS

Office Action for corresponding U.S. Appl. No. 15/142,182, dated Feb. 21, 2017.

*Primary Examiner* — Sharad Rampuria
(74) *Attorney, Agent, or Firm* — Greenberg Traurig, LLP; Chinh H. Pham; Todd C. Basile

(57) ABSTRACT

Systems and methods for controlling and locating the source of a remote signal, comprising a first electronic device configured to transmit a first wireless signal containing information concerning a power level of the first electronic device, and a second electronic device configured to: measure a strength of the first wireless signal; approximate a proximity of the second electronic device to the first electronic device; identify, based on the approximated proximity and the information concerning the power level of the first electronic device, one or more changes to a configuration of the first wireless signal for optimizing power consumption of the first electronic device during a search for the first electronic device; and instruct the first electronic device, via a second wireless signal, to transmit the first wireless signal with the at least one or more identified configuration changes.

16 Claims, 5 Drawing Sheets

(51) Int. Cl.

| | | |
|---|---|---|
| *G08B 3/10* | (2006.01) | |
| *H04W 64/00* | (2009.01) | |
| *H04B 1/3827* | (2015.01) | |
| *H04W 8/00* | (2009.01) | |
| *G08B 21/18* | (2006.01) | |
| *H04W 52/08* | (2009.01) | |
| *H04W 52/14* | (2009.01) | |
| *H04W 52/28* | (2009.01) | |
| *H04B 17/27* | (2015.01) | |
| *H04W 52/02* | (2009.01) | |
| *G08B 21/02* | (2006.01) | |
| *H04B 17/318* | (2015.01) | |
| *H04W 84/12* | (2009.01) | |
| *H04W 4/00* | (2018.01) | |

(52) U.S. Cl.
CPC ....... *G08B 21/0269* (2013.01); *G08B 21/182* (2013.01); *H04B 1/3827* (2013.01); *H04B 17/27* (2015.01); *H04W 8/005* (2013.01); *H04W 52/0245* (2013.01); *H04W 52/0254* (2013.01); *H04W 52/08* (2013.01); *H04W 52/146* (2013.01); *H04W 52/247* (2013.01); *H04W 52/248* (2013.01); *H04W 52/283* (2013.01); *H04W 52/288* (2013.01); *H04W 64/00* (2013.01); *H04B 17/318* (2015.01); *H04W 4/008* (2013.01); *H04W 84/12* (2013.01); *Y02B 60/50* (2013.01)

(58) Field of Classification Search
CPC ... H04W 52/146; H04W 52/16; H04W 52/18; H04W 52/20; H04W 52/22; H04W 52/221; H04W 52/223

USPC .......................................... 455/41.2, 522, 69
See application file for complete search history.

(56) References Cited

U.S. PATENT DOCUMENTS

| | | | |
|---|---|---|---|
| 2010/0331932 A1* | 12/2010 | Stevenson | A61N 1/056 607/115 |
| 2011/0237226 A1* | 9/2011 | Dhuna | H04M 1/7253 455/414.1 |
| 2013/0044612 A1 | 2/2013 | Hirsch | |
| 2013/0088384 A1* | 4/2013 | Syrjarinne | G01S 19/05 342/357.42 |
| 2013/0113993 A1 | 5/2013 | Dagit | |
| 2014/0030982 A1 | 1/2014 | Cardona | |
| 2014/0302842 A1* | 10/2014 | Lloyd | H04L 41/0806 455/426.1 |
| 2014/0370879 A1 | 12/2014 | Redding | |
| 2015/0063139 A1 | 3/2015 | Zhang | |
| 2015/0093990 A1 | 4/2015 | Lin | |
| 2015/0119071 A1* | 4/2015 | Basha | H04W 64/00 455/456.1 |
| 2015/0296553 A1 | 10/2015 | DiFranco | |
| 2016/0139273 A1* | 5/2016 | Sobol | G01S 19/16 342/357.52 |
| 2016/0255473 A1* | 9/2016 | Abraham | H04W 4/023 370/328 |
| 2016/0321898 A1 | 11/2016 | Braxton | |
| 2016/0335876 A1* | 11/2016 | Verma | G01S 11/06 |
| 2016/0337809 A1* | 11/2016 | Narasimha | H04W 4/04 |

* cited by examiner

SYSTEMS AND METHODS FOR CONTROLLING AND LOCATING THE SOURCE OF A REMOTE BEACON SIGNAL

RELATED U.S. APPLICATIONS

This application claims priority to U.S. Provisional Patent Application Ser. No. 62/189,382, filed Jul. 7, 2015, which is incorporated herein by reference in its entirety for all purposes.

TECHNICAL FIELD

The present invention relates to communications technologies, and more particularly, two-way communications for use in locating a target device.

BACKGROUND

Numerous technologies exist for locating an electronic device using a signal emitted by the device. For example, the source of the signal (i.e., the electronic device) can be triangulated to determine its geographic location if suitable communications infrastructure exists. As another example, the signal may contain location information, such as GNSS coordinates, that may be used to locate the electronic device that emitted the signal. As yet another example, the strength of the signal may be monitored to guide one searching for the electronic device towards its location, similar to the way radioactive material may be located with a Geiger Counter utilizing only one technology versus multiple.

The usefulness of these and other technologies may be limited by a number of factors. In one aspect, an electronic device may require network connectivity (e.g., cellular, satellite, GNSS, etc.) to acquire and transmit its coordinates and other information that may be used to help locate the device. In another aspect, the power consumed in transmitting outgoing signals and/or processing incoming signals may deplete a device's power supply before it can be found.

SUMMARY OF THE INVENTION

The present disclosure is directed to a system for controlling and locating the source of a remote signal. The system may include a first electronic device configured to transmit a first wireless signal containing information concerning a power level of the first electronic device, and a second electronic device configured to locate and control the first electronic device. The second electronic device may be configured to measure a strength of the first wireless signal; approximate, based on the measured strength of the first wireless signal, a proximity of the second electronic device to the first electronic device; identify, based on the approximated proximity and the information concerning the power level of the first electronic device, one or more changes to a configuration of the first wireless signal for optimizing power consumption of the first electronic device during a search for the first electronic device; and instruct the first electronic device, via a second wireless signal, to transmit the first wireless signal with the at least one or more identified configuration changes. The second electronic device may be configured to perform any one or combination of these functionalities as the second device hones in on the location of the first electronic device. Some systems of the present disclosure may include a plurality of search devices configured to share information and commands with each other and with remote networks to facilitate the search for the first electronic device.

In another aspect, the present disclosure is directed to method for controlling and locating the source of a remote signal. The method may include transmitting, from a first electronic device, a first wireless signal containing information concerning a power level of the first electronic device; measuring, by a second electronic device, a strength of the first wireless signal; approximating by the second electronic device, based on the measured strength of the first wireless signal, a proximity of the second electronic device to the first electronic device; identifying by the second electronic device, based on the approximated proximity and the information concerning the power level of the first electronic device, one or more changes to a configuration of the first wireless signal for optimizing power consumption of the first electronic device during a search for the first electronic device; and instructing the first electronic device, via a second wireless signal from the second electronic device, to transmit the first wireless signal with the at least one or more identified configuration changes. Any one or combination of these steps may be repeated as the second electronic device hones in on the location of the first electronic device. Some methods of the present disclosure may include steps for sharing information and commands amongst a plurality of search devices with remote networks to facilitate the search.

BRIEF DESCRIPTION OF DRAWINGS

For a more complete understanding of this disclosure, reference is now made to the following description, taken in conjunction with the accompanying drawings, in which.

DESCRIPTION OF SPECIFIC EMBODIMENTS

Figure 1A:
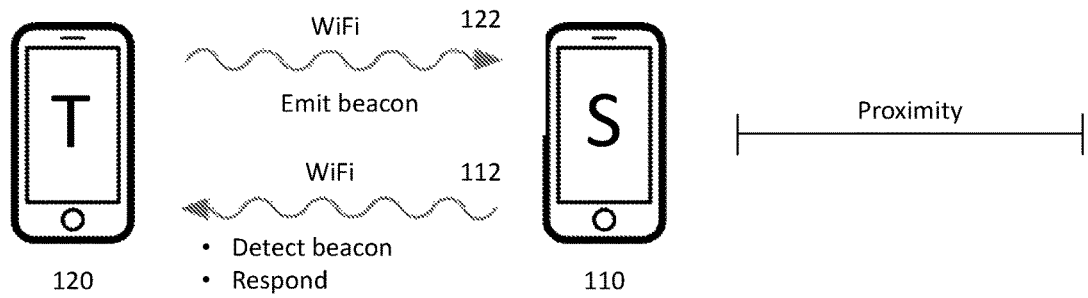
FIGS. 1A-1I schematically depict representative steps for locating and controlling the operation of a target device with a search device during a search for the target device, in accordance with one embodiment of the present disclosure.

Embodiments of the present disclosure generally provide system 100 and associated methods for utilizing two-way communication between a search device 110 and a target device 120 for use in locating the target device. Embodiments of system 100 may provide for processing information regarding or contained within a signal 122 (sometimes referred to herein as a beacon) emitted by the target device 120, as well as for controlling, via a signal 112 emitted by the search device 110, functionality of the target device 120. These and other features may provide for the ability to optimize efforts to communicate with and locate the target device 120. Further, such features provide for controlling the power consumed by the target device 120 during a search, thereby enhancing the chances of locating the target device 120 before it is drained of the power necessary to transmit signal 122.

Devices 110, 120 may include any suitable electronic devices configured for sending and receiving wireless signals 112, 122, respectively. In one embodiment, one or both of devices 110, 120 may be a smartphone. In another embodiment, one or both of devices 110, 120 may be a wearable electronic device, such as a locator watch, anklet, pendant, animal collar, etc., worn by a user. In yet another embodiment, one or both of devices 110, 120 may be configured to be built into or included as part of another device, such as a laptop computer, vehicle, airborne equipment, etc. Of course, the present disclosure is not intended to be limited to any particular electronic devices 110, 120, and other suitable electronic devices capable of sending and receiving wireless signals 112, 122 will be understood by one of ordinary skill in the art.

Wireless signals 112, 122 may include any suitable signal capable of being directly emitted and received between devices 110, 120. In various embodiments, signals 112, 122 may be radio frequency waves or the like. Signals 112, 122 may vary from longer range signals such as LoRa, Sigfox, CIoT (Cellular Internet of Things) to mid-range signals such as WiFi, Bluetooth Low Energy (BLE), to short-range signals such as near field communication (NFC), Bluetooth Classic, Zigbee and others. Of course, any other suitable signal is envisioned within the scope of the present disclosure.

In this manner, devices 110, 120 may communicate with each other independent of connectivity with cellular, satellite, and other large-scale Wide Area Network (WAN) communications networks. This may be particularly useful if one or both of the devices cannot establish connectivity with such networks—for example, if the device(s) are in an area lacking cell tower coverage (e.g., a rural, wilderness, or indoor area), or an area suffering from atmospheric interference (e.g., cloud cover/storms) significant enough to interrupt satellite transmissions. It should be recognized that devices 110, 120 of system 100 may communicate indirectly with one another as well if there is network connectivity throughout a portion or the duration of the search; however, as later described, it may be advantageous from battery life and other standpoints to utilize less power-intensive wireless signals 112, 122 instead.

Locating Target Device 120 Using Beacon Signal 122

In order to locate target device 120, search device 110 may be configured to home in on the beacon signal 122 emitted from target device 120. In particular, in one embodiment, search device 110 may be configured to repeatedly measure the strength of beacon signal 122 as search device 110 is swept through a search area. The signal strength and the corresponding position of search device 110 at each reading may be used to determine a geographic vector pointing in the direction of increasing signal strength. This vector, in turn, may point towards target device 120, the source of signal 122. Search device 110 may continue to be used to sweep for the source of signal 122 until it is located in this fashion. In another embodiment, multiple search devices 110 may be used to triangulate the source of beacon signal 122 to locate target device 120 using known techniques in the art.

additionally or alternatively, in various embodiments, search device 110 may be configured to approximate its proximity to target device 120. In such embodiments, search device 110, upon detecting beacon signal 122, may monitor the strength of the beacon signal 122 and calculate, based on the measured strength of the beacon signal 122, the proximity of search device 110 to target device 120. In particular, some embodiments, search device 110 may compare the measured strength of beacon signal 122 to a strength at which beacon signal 122 was transmitted ("transmission strength"), and determine an approximate proximity based on the drop in signal strength.

Transmission strength, in an embodiment, may be predetermined in system 100—for example, system 100 may be configured such that target device 120 will transmit beacon signal 122 at a predetermined transmission strength known (e.g., pre-programmed into) search device 110. For example, beacon 120 may be set to broadcast signal 122 at a given transmission strength (dB), and full signal strength is expected to be measurable at a given distance (meters). Search device 110 may measure a received signal strength indicator (RSSI) or other suitable metric of the strength of signal 122 as received, and extrapolate its physical proximity to target device 110 by comparing the measured RSSI (dB) and expected signal range (meters). In other embodiments, locator 110 may forego spatial distance calculations, and instead compare the measured RSSI of tracking signal 122 to a known strength of the emitted beacon tracking signal 122 as a gauge of proximity.

in another embodiment, information concerning the transmission strength may be included in beacon signal 122 for receipt by search device 110. Upon receiving beacon signal 122, search device 110 may process beacon signal 122 to extract the included information regarding transmission strength. The information may be the actual transmission strength, an identifier of transmission strength that search device 110 may use to locally look up (e.g., in a lookup table) or otherwise determine transmission strength, or any other suitable information that can be used by search device 110 to determine the transmission strength of beacon signal 122.

Beacon signal 122, in various embodiments, may be have a transmission strength suitable for allowing search device 110 to measure its proximity to the target device 120 when within a desired range. In some embodiments, beacon signal 122 may be configured to be detected at longer ranges, and in other embodiments, may be configured to be detected at closer ranges. Transmission strength may be tailored for a given application of system 100.

Managing Functionality of Target Device 120 Using Bi-Directional Communications While such an approach, on its own, would most likely be effective for locating target device 120, in various other embodiments, system 100 may further include two-way communication between search device 110 and target device 120 for enhanced functionality. In particular, search device 110, in addition to receiving beacon signal 122 from target device 120, may be further configured to communicate back to target device 120. In this way, search device 110 can request information from and issue commands to target device to control, amongst other things, characteristics of the emitted beacon signal 122, as well as to enable/disable various features of target device 122. This may be used to optimize the search process and preserve battery life of target device 120. Such an arrangement may further preserve battery life of target device 120 by allowing for search device 110 to offload power-consuming processing tasks from target device 120.

to that end, in various embodiments, search device 110 may be configured to manage and control aspects of the operation of target device 120 during a search via signal 112. In one such embodiment, search device 110 may be configured to issue commands to target device 120 to control characteristics of beacon signal 122, such as signal type (e.g., Wi-Fi, Bluetooth, NFC, etc.), signal strength, the interval at which the beacon signal is emitted, and the duration for which the beacon signal is emitted, amongst others. Additionally or alternatively, search device 110 may be further configured to issue commands to target device 120 via signal 112 to enable or disable certain components or functionalities of target device 120. For example, search device 110 may instruct target device 120 to turn on its GNSS receiver and attempt to establish connectivity with GNSS satellites or cellular networks. As another example, search device 110 may instruct target device 120 to enable text messaging, verbal communication, video streaming, etc. between devices 110, 120 via signals 112, 122. As yet another example, search device 110 may instruct target device 120 to activate, if so equipped, an audio or visual beacon that may be used listened for or looked for by searchers. Still further, search device 110 may instruct target device 120 to disable network connectivity, even if it is available, and instead only emit beacon signal 122 to save power.

Additionally or alternatively, it may be desirable to reduce the strength at which beacon signal 122 is emitted from target device 120 as search device 110 gets closer and closer to target device 120. Generally speaking, at further distances from target device 120, there is a higher likelihood that beacon signal 122 may be affected by physical obstacles (e.g., furniture) and other impediments. Thus, the measured strength of beacon signal 122 at search device 110 may float more at longer ranges from target device 120 as compared to the degree of float expected at closer ranges. Accordingly, search device 110 may be configured to instruct target device 120 to transmit beacon signal 122 at a higher transmission strength when search device 110 is relatively far away to compensate for impediment-related or other causes of float, and at lower signal strengths when search device 110 is relatively closer. This may enhance the fidelity with which search device 110 can determine spatial proximity to target device 120. In some cases, it can be easier to assess changes in the RSSI of beacon signal 122 at closer proximities when lower signal strengths are used compared with the much higher signal strengths used when search device 110 is more distal from target device 120.

Search device 110 may, in various embodiments, utilize information received from various sources to determine appropriate commands to issue. In some embodiments, this information may be provided by target device 120 via beacon signal 122. In one embodiment, ascertaining the strength and type of signal 122 may be used to estimate how far away the target device 120 is from the search device 110. The search device 110 may, in turn, process this information to assess whether to instruct the target device to do things such as switch to a more appropriate signal type, and/or to increase or decrease the interval at which the beacon signal is emitted. For example, if the search device 110 determines from the ascertained information that the target device 120 is likely within range of a lower-power signal type (e.g., Bluetooth LE) than that currently transmitted by the target device (e.g., Wi-Fi), search device 110 may instruct the target device 120 to switch in favor of saving battery power. Similarly, if the search device 110 cannot ascertain a reliable vector towards the target device 120 from the beacon signal 122, it may instruct the target device, via signal 112, to increase the rate (i.e., reduce the interval) and/or duration for which signal 122 is emitted, thereby enhancing the chances of locating the target device 120.

In another embodiment, target device 120 may be configured to provide, via beacon signal 122, any sort of useful information about the target device 120 such as battery level, its last known GNSS coordinates, the types of communication signals it is capable of sending and receiving, other capabilities it may have (e.g., messaging, audio/visual beacons, cellular, GNSS, etc.), as well as the status of these features and their current settings. Search device 110 may, in turn, process this information to determine an optimal configuration based on goals such as quickly locating target device 120 whilst minimizing battery consumption, amongst others. For example, if the battery level of the target device is high and proximity judged to be fairly close, search device 110 may instruct target device 120 to emit beacon signal 122 at a high rate (i.e., short interval) so that search device 110 may quickly determine the direction of the target device 120 and quickly home in on it. Conversely, if the battery level of the target device 120 is low and/or the proximity thereto judged as fairly distant, the search device 110 may instruct the target device to take actions that would reduce power consumption, such as turning off various features and reducing the rate at which beacon 122 is emitted (i.e., increasing the interval).

Additionally or alternatively, in other embodiments, relevant information may be provided to search device 110 by other sources. For example, in one embodiment, the search device 110 itself may determine that it is now possible to establish satellite, cellular, internet, or other forms of connectivity, and may in turn instruct target device 120 to enable a corresponding component in target device 120 (possibly previously-disabled to save power) and attempt to connect to the detected network. In another embodiment, the search device 110 may receive location information concerning other search devices 110 involved in the search, and instruct target device 120 to adjust its settings in a manner that optimizes the target device 120 for communication with a closer search device 110. In yet another embodiment, the search device 110 may receive location information concerning the target device 120 from another source, and based on this information, instruct the target device to adjust its settings. For example, a search helicopter may spot the target device 120 (or a user thereof) and communicate its location to the search device 110 of an on-the-ground rescuer. The rescuer's search device 110 may use this information and the rescuer's known position to select an optimal configuration of the target device 120 that would quickly lead the rescuer to it.

Figure 2:
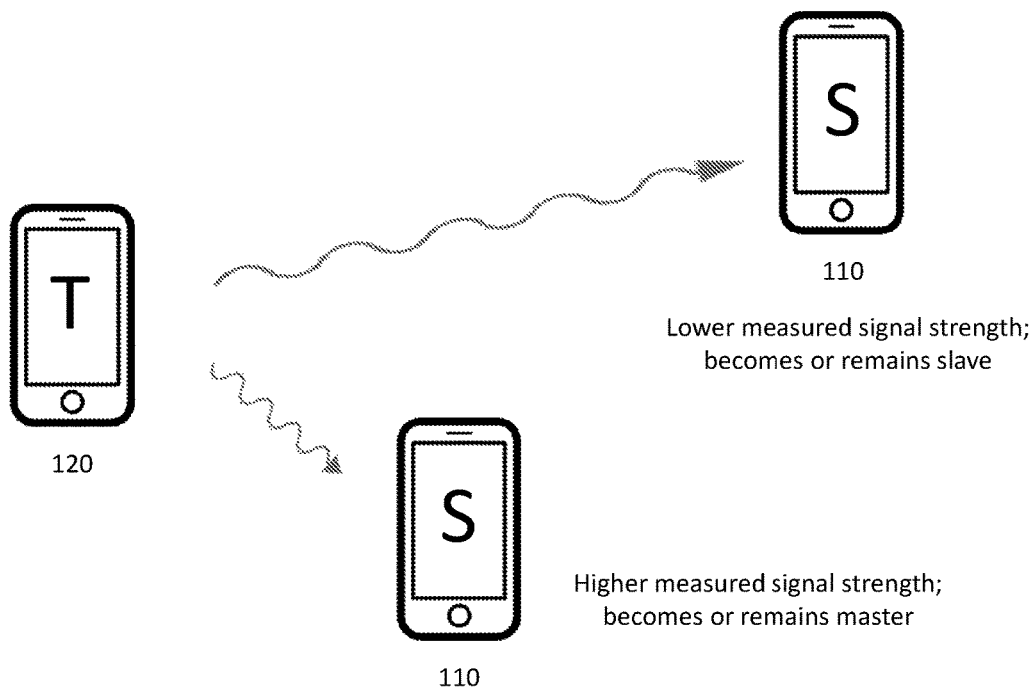
FIG. 2 schematically depicts a system configured to designate master and slave search devices based on measured signal strength, in accordance with one embodiment of the present disclosure.

Referring to FIG. 2, in an embodiment, system 100 may be configured to compare strength measurements of wireless signal 122 as taken by various search devices 110, and in turn, designate as master that particular search device 110 closest to target 120 and designate as slaves those other search devices 110 measuring lower signal strengths. This master search device 110 may then orchestrate at least some of the functionality of both target device 120 and slave search devices 110 involved in the search. Should one of the slave search devices 110 later register a stronger signal strength than that registered by the master search device, that slave device 110 may become master, and the former master designated a slave.

Figure 3:
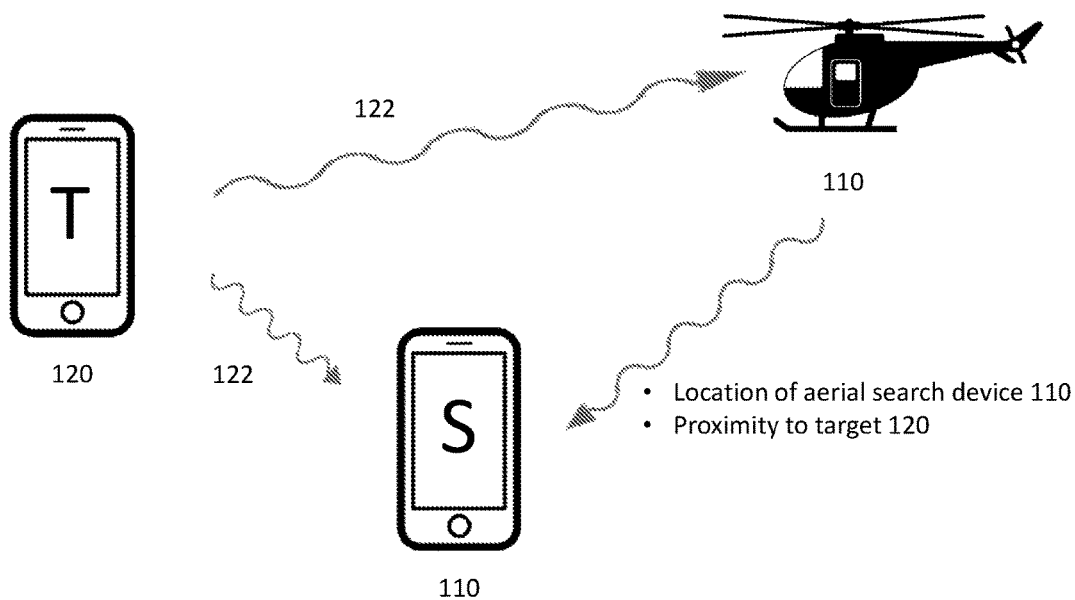
FIG. 3 schematically depicts a system configured to share information amongst two or more search devices to approximately triangulate the location of a target device, in accordance with one embodiment of the present disclosure.

Referring to FIG. 3, in some embodiments, system 100 may be configured such that search devices 110 may share information to more quickly and accurately locate target device 120. This may be particularly effective when one or more of the search devices lacks the ability to ascertain its own location (e.g., it is unable to connect to GNSS satellite, as may be the case with a device carried by a ground searcher in rough terrain), but another search device does (e.g., one situated on a helicopter above rough terrain). In such an example, the search device having a known location could transmit its location, along with its strength measurements of the signal 122 being emitted from target device 120, to the other search device lacking GNSS connectivity. The unconnected search device 110 could utilize this information, along with its own measurements of the strength of signal 122, to approximately triangulate the location of the target device using known methods.

Figure 4:
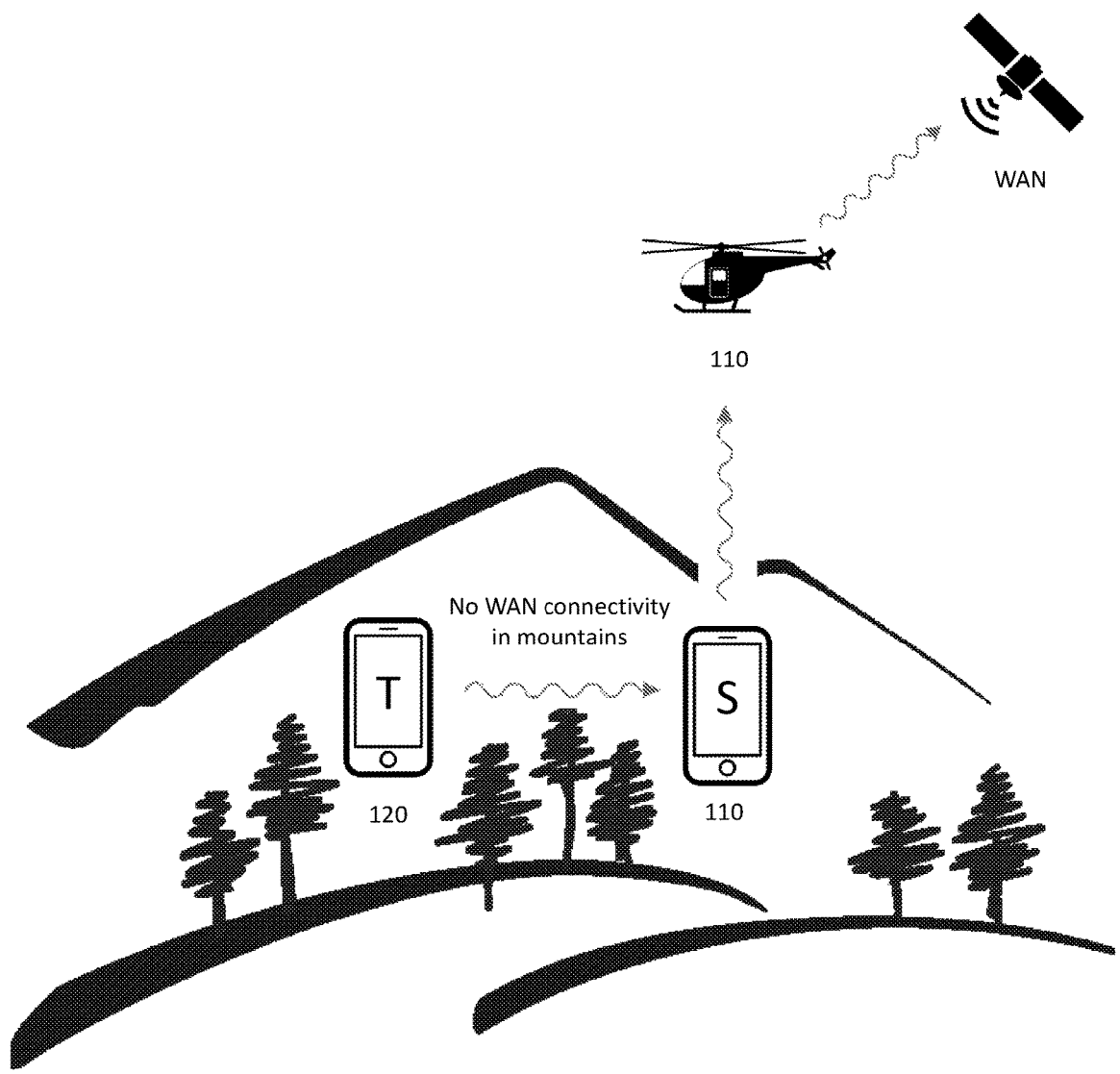
FIG. 4 schematically depicts a system configured to relay information to and from a search device lacking connectivity with a Wide Area Network (WAN), in accordance with one embodiment of the present disclosure.

Referring to FIG. 4, in an embodiment, system 100 may be configured to "daisy-chain" two or more search devices 110 to enable communications to a WAN, thereby allowing for remote command and control of the search. In the example shown, ground-based search device 110 lacks WAN-connectivity in the mountains, but is capable of communicating via radio or other transmissions with aerial-based search device 110 flying above, which does have connectivity to a WAN. As configured, ground-based search device 110 may communicate information concerning the search and the location of target device 120 to the WAN via aerial-based search device 110, thereby increasing situational awareness. Similarly, information could flow the opposite direction, thereby allowing remotely-situated personnel to request information, send information, and/or issue commands to unconnected search devices 110 and/or target device 120.

Of course, these are merely examples of possible inputs and commands that may be received and issued, respectively, by search device 110 via signal 112, and one of ordinary skill in the art will recognize a number of other suitable information that may be provided by or ascertained from beacon 112 or other sources, and utilized by search device 110 for managing and controlling target device 120 within the scope of this disclosure.

It should be recognized that it may be advantageous to provide the aforementioned logic directly on the search device 110, rather than on a remote server, so that information and commands may be processed independent of connectivity between the search device 110 and the remote server. This may provide greater flexibility to search parties, as well as possibly reducing power consumption in the search device 110 itself. Of course, the present disclosure is not limited to such an embodiment, and should be read to include embodiments in which some or all processing occurs remotely from the search device 110. Indeed, it should be noted that regardless of where processing occurs, search device 110 may utilize network connectivity, if available, to pass along information relevant to the search to other connected parties.

It should be further recognized that target device 120 itself may additionally contain logic for managing and controlling beacon signal 122 and its other features. This may prove particularly useful for managing battery power prior to first contact with search device 110 and thereafter should contact be lost. Such logic may also assist in configuring beacon signal 122 to have the best chance of making initial contact with search device 110. As previously noted in the context of the management and control functionality of search device 110, it may be important to balance battery life of the target device 120 with transmitting the most effective signal 122, in order to produce the most effective search.

Applications

System 100 may be used in any number of suitable applications including, without limitation, finding missing persons, capturing house-arrest violators, recovering kidnapping victims, and locating lost or stolen items. Of course, the present disclosure is not intended to be limited to any particular application, and other applications of system 100 will be understood by one of ordinary skill in the art.

Example

Referring now to FIGS. 1A-1I, an example embodiment of system 100 and its use is described. Jimmy, an elderly man that suffers from Alzheimer's, wears an electronic bracelet (i.e., target device 120) that may be used to help locate him if he wanders away. A system that monitors his bracelet detects that Jimmy has wandered off, and triggers an alert to notify certain family members, caregivers, monitoring services, and/or public safety officials of the event. A search is initiated.

Jimmy's bracelet receives the alert and sends information concerning Jimmy's location to the responders; however, this is short lived, as Jimmy quickly ventures into thick-canopied wilderness area with no cellular or satellite connectivity. Jimmy's bracelet detects this lack of connectivity, and automatically disables these components and others to save battery power, and begins periodically emitting its longest-range radio signal type, Wi-Fi, as a locator beacon (i.e., signal 122).

Jimmy's daughter, Sarah, is the first to reach his last known location. She has previously installed a mobile app on her smartphone (i.e., search device 110) that is configured, in part, to transmit, receive, and process Wi-Fi, Bluetooth LE, and NFC signals to and from Jimmy's bracelet. The mobile app provides Sarah the option to manually or automatically manage and control features of Jimmy's bracelet via her transmitted signals once radio contact is established. In this way, Sarah's smartphone can evaluate the best way to obtain the information it needs from Jimmy's bracelet, whilst simultaneously helping Jimmy's bracelet to preserve battery power by eliminating non-essential functionality and offloading information processing tasks. It is critical that Jimmy's bracelet be able to act as a beacon until he is found. Sarah's smartphone battery, on the other hand, is of lesser importance because she is of sound mind, carries a battery recharging pack, and is able to pass off the search to another responder if her smartphone battery is about to die.

FIG. 1A: Sarah heads into the wilderness area using her smartphone to try to detect Jimmy's bracelet beacon signal. After some blind searching, her smartphone detects one of the periodic Wi-Fi beacon emissions from Jimmy's bracelet. Her smartphone automatically transmits a Wi-Fi signal (i.e., signal 112) to notify Jimmy's bracelet that it has detected its beacon.

Figure 1B:
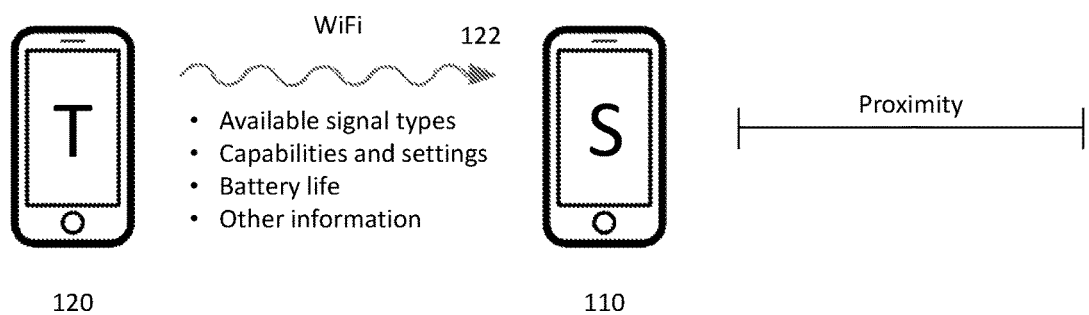

FIG. 1B: Jimmy's bracelet detects the response signal emitted by Sarah's smartphone, and in turn, emits a Wi-Fi signal containing information that Sarah's smartphone may use to enhance the search process. In particular, the bracelet communicates its battery power level, information about its communications abilities (e.g., it is about to send/receive Wi-Fi, Bluetooth LE, and NFC), how it is currently configured to operate (e.g., which features are on/off, beacon emission rate, etc.). Also included are some of Jimmy's vital signs (e.g., pulse) as detected by sensors in Jimmy's bracelet. Sarah's smartphone receives this signal from Jimmy's bracelet.

Figure 1C:
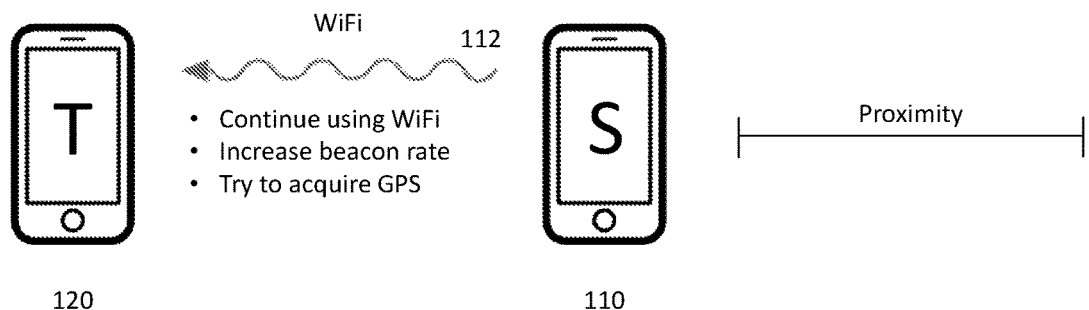

FIG. 1C: Sarah's smartphone processes the received information. Jimmy's pulse is very high, which may indicate that he is running—she may lose his signal soon. Even though the bracelet is starting to get low on battery power, Sarah's smartphone determines that it is of utmost importance to determine a vector in Jimmy's general direction. Accordingly, Sarah's smartphone transmits a Wi-Fi signal instructing Jimmy's bracelet to increase its beacon rate (i.e., shorten the interval between successive signal transmissions) so that it can quickly acquire additional beacon strength samples as Sarah continues moving. It also contains instructions to Jimmy's bracelet to attempt to reestablish GNSS connectivity, as Sarah's smartphone recently detected increased GNSS signal strength from a GNSS satellite. Jimmy's bracelet receives this signal, but is unable to connect to a GNSS satellite signal from his current location.

Figure 1D:
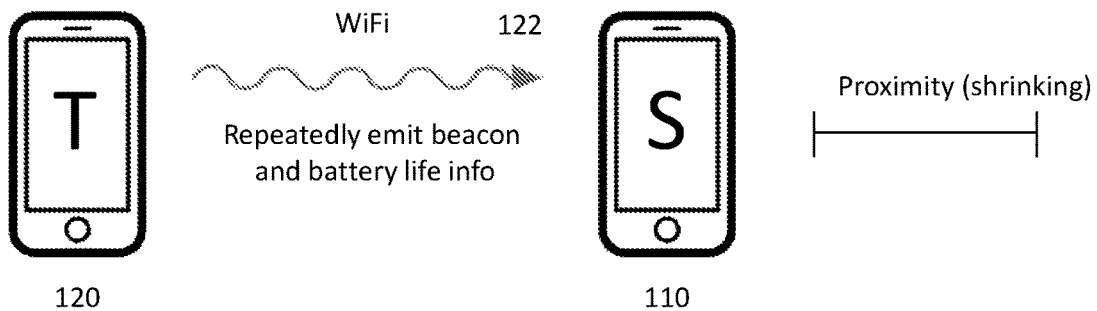

FIG. 1D: Jimmy's bracelet continues emitting a WiFi beacon as instructed. To save power, the signal only contains information concerning the bracelet's current battery power level. Sarah continues to follow Jimmy's beacon, closing the distance.

Figure 1E:
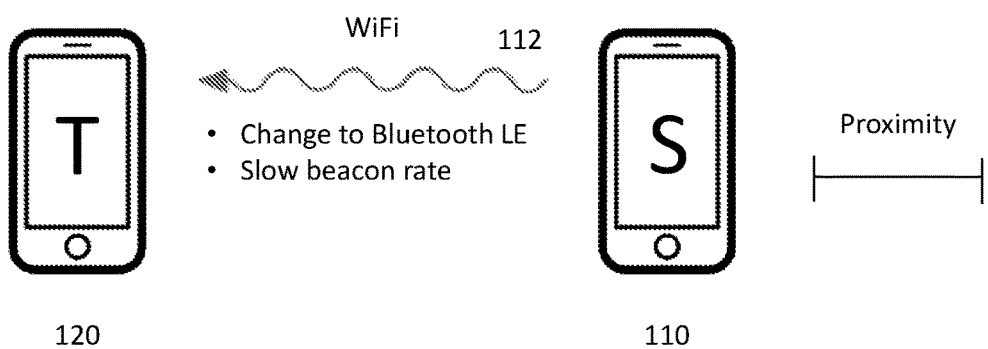

FIG. 1E: Sarah's smartphone, based on the increasing strength of Jimmy's WiFi signal, determines that it may be within range of a more medium-range signal, such as Bluetooth LE. Such a signal requires less power, and thus Sarah's smartphone transmits a WiFi signal to Jimmy's bracelet to activate its Bluetooth LE capabilities and attempt to detect her Bluetooth LE signal. This is successful, and Jimmy's bracelet deactivates its WiFi capability and begins emitting a Bluetooth LE signal, thereby saving battery power whilst maintaining periodic contact with Sarah's smartphone.

Unfortunately; however, Sarah has encountered a bog and her progress is slowed dramatically. Her smartphone, based on the information contained in Jimmy's most recent beacon signal, knows that Jimmy's battery is running pretty low. Sarah's smartphone instructs Jimmy's bracelet to slow its beacon rate (i.e., increase the interval between successive emissions) to save power while Sarah works her way out of the bog.

Figure 1F:
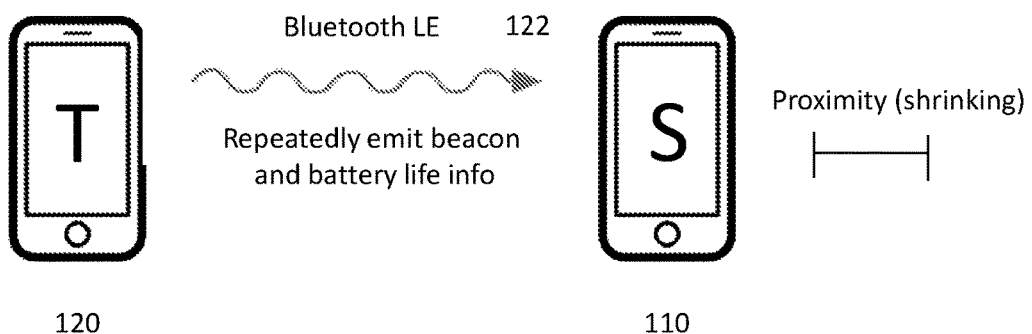

FIG. 1F: Sarah is out of the bog and closing rapidly on Jimmy's position, using the strength of the bracelet's Bluetooth LE beacon to guide her way.

Figure 1G:
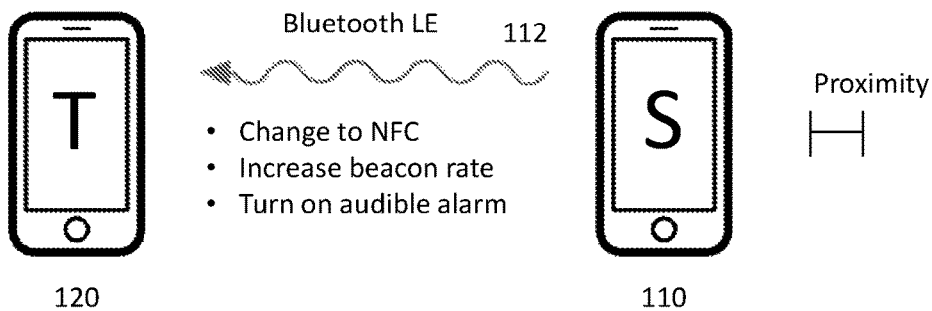

FIG. 1G: It is dark now and Sarah knows she's very close to Jimmy, but cannot see him in the moonless night. He has fallen asleep and is oblivious to her shouts. Jimmy's last bracelet transmission indicates that its power level is critical and will expire within minutes. Sarah's smartphone sends a Bluetooth LE signal containing instructions for Jimmy's bracelet to switch to NFC to save what little battery power is left. The signal also instructs Jimmy's bracelet to activate an audible alarm. It sounds for a moment, briefly alerting Sarah to Jimmy's position, but then immediately fails, having been damaged during a spill Jimmy took in the ravine earlier.

Figure 1H:
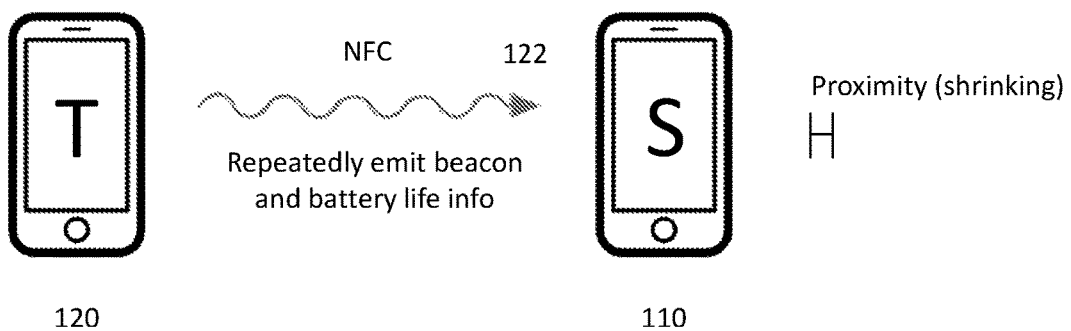

FIG. 1H: The bracelet continues emitting NFC beacon signals.

Figure 1I:
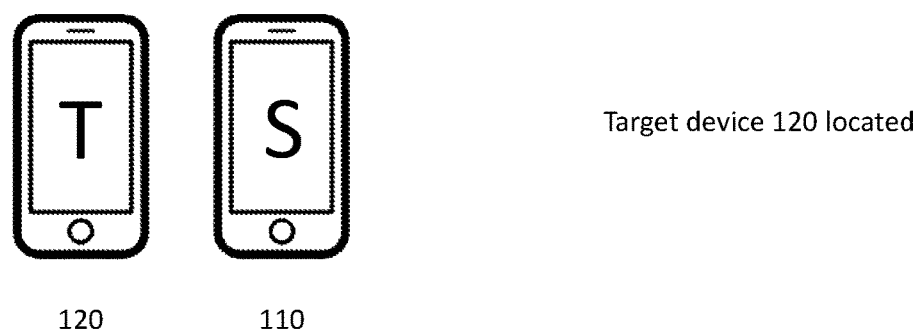

FIG. 1I: Sarah runs toward the bushes where she heard the brief audible alarm, and sweeps her smartphone towards each bush until it detects the bracelet's NFC signal. She reaches into the bush and finds Jimmy, a little confused and shaken up, but no worse for wear.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

What is claimed is:

1. A system for controlling and locating the source of a remote signal, the system comprising:
   a first electronic device configured to transmit a first wireless signal containing information concerning a battery power level of the first electronic device; and
   a second electronic device configured to:
   measure a strength of the first wireless signal, approximate, based on the measured strength of the first wireless signal,
   a proximity of the second electronic device to the first electronic device, identify, based on the approximated proximity and the information concerning the battery power level of the first electronic device, one or more changes to at least one of a frequency, a transmission strength, and a transmission interval of the first wireless signal for optimizing battery power consumption of the first electronic device during a search for the first electronic device,
   instruct the first electronic device, via a second wireless signal, to transmit the first wireless signal with the at least one or more identified changes in at least one of the frequency, the transmission strength, and the transmission interval of the first wireless signal;
   approximate, based on measuring a strength of two or more first wireless signal transmissions, a vector from the second electronic device towards the first electronic device; and
   instruct the first electronic device to transmit the first wireless signal at a shorter interval to improve an accuracy of the vector approximation.

2. The system as set forth in claim 1, wherein the first electronic device is a smartphone, locator watch, anklet, pendant, or animal collar configured to be worn or carried by a person, animal or vehicle.

3. The system as set forth in claim 1, wherein the second electronic device approximates the proximity of the second electronic device to the first electronic device by comparing the measured strength of the first wireless signal to a transmission strength of the first wireless signal from the first electronic device.

4. The system as set forth in claim 3, wherein the first wireless signal contains information concerning the transmission strength of the first wireless signal from the first electronic device.

5. The system as set forth in claim 1, wherein a change in the frequency of signal transmitted includes selecting a signal frequency having a transmission range corresponding with the approximated proximity of the second electronic device to the first electronic device.

6. The system as set forth in claim 1, wherein a change in the strength at which the signal is transmitted includes reducing signal transmission strength at closer approximated proximities, and increasing signal transmission strength at farther approximated proximities.

7. The system as set forth in claim 1, wherein a change in the interval at which the signal is transmitted includes shortening the interval at closer approximated proximities, and increasing the interval at farther approximated proximities.

8. The system as set forth in claim 1, wherein the second electronic device is further configured to instruct the first electronic device, via the second wireless signal, to enable or disable one or more features of the first electronic device.

9. The system as set forth in claim 8, wherein the second electronic device is configured to instruct the first electronic device to enable an alarm feature of the first electronic device when the approximated proximity is below a predetermined proximity threshold.

10. The system as set forth in claim 8,
wherein the second electronic device is configured to instruct the first electronic device to enable a Global Navigation Satellite System (GNSS) feature of the first electronic device when the second electronic device detects that GNSS network connectivity is available and that the approximated proximity is below a predetermined proximity threshold, and
wherein the first electronic device is configured to include, in a subsequent transmission of the first wireless signal, information concerning a location of the first electronic device received from the GNSS network.

11. The system as set forth in claim 1, further including a third electronic device in communication with the first electronic device and the second electronic device, wherein the one of the second and third electronic devices measuring the highest strength of the first wireless signal acts as a master, controlling at least some functionality of both the first electronic device and the other of the second and third electronic devices.

12. The system as set forth in claim 1, further including a third electronic device in communication with the first electronic device and the second electronic device, wherein the third electronic device is configured to transmit, to the second electronic device, 1) information concerning an approximated proximity of the third electronic device to the first electronic device along, and 2) information concerning a location of the third electronic device, such that the second electronic device may triangulate an approximate position of the first electronic device.

13. The system as set forth in claim 1, further including a third electronic device in communication with the second electronic device and a wide area network, wherein the second electronic device is configured to transmit, to the third electronic device, information concerning a location of the first electronic device for transmission to the wide area network.

14. A method for controlling and locating the source of a remote signal, the method comprising:
transmitting, from a first electronic device, a first wireless signal containing information concerning a battery power level of the first electronic device;
measuring, by a second electronic device, a strength of the first wireless signal;
approximating by the second electronic device, based on the measured strength of the first wireless signal, a proximity of the second electronic device to the first electronic device;
identifying by the second electronic device, based on the approximated proximity and
the information concerning the battery power level of the first electronic device, one or more changes to at least one of a frequency, a transmission strength, and a transmission interval of the first wireless signal for optimizing power consumption of the first electronic device during a search for the first electronic device;
instructing the first electronic device, via a second wireless signal from the second electronic device, to transmit the first wireless signal with the at least one or more identified changes in at least one of the frequency, the transmission strength, and the transmission interval of the first wireless signal;
approximating by the second electronic device, based on measuring a strength of two or more first wireless signal transmissions, a vector from the second electronic device towards the first electronic device; and
instructing, by the second electronic device, the first electronic device to transmit the first wireless signal at a shorter interval to improve an accuracy of the vector approximation.

15. The method as set forth in claim 14, further including transmitting, from a third electronic device to the second electronic device, 1) information concerning an approximated proximity of the third electronic device to the first electronic device along, and 2) information concerning a location of the third electronic device, such that the second electronic device may triangulate an approximate position of the first electronic device.

16. The method as set forth in claim 14, further including transmitting, from the second electronic device to a third electronic device, information concerning a location of the first electronic device for transmission to a wide area network in communication with the third electronic device.

* * * * *